(12) United States Patent
Halim et al.

(10) Patent No.: US 11,396,968 B2
(45) Date of Patent: Jul. 26, 2022

(54) QUICK RELEASE THREAD PROTECTOR FOR THREADS OF A PIPE

(71) Applicant: UNIARMOUR LLC, Houston, TX (US)

(72) Inventors: Hazem Abdel Halim, Houston, TX (US); Alessandro Caccialupi, Houston, TX (US)

(*) Notice: Subject to any disclaimer, the term of this patent is extended or adjusted under 35 U.S.C. 154(b) by 0 days.

(21) Appl. No.: 17/117,021

(22) Filed: Dec. 9, 2020

(65) Prior Publication Data

US 2021/0172560 A1 Jun. 10, 2021

Related U.S. Application Data

(60) Provisional application No. 62/945,646, filed on Dec. 9, 2019.

(51) Int. Cl.
*F16L 57/00* (2006.01)
*F16L 57/06* (2006.01)

(52) U.S. Cl.
CPC .............. *F16L 57/005* (2013.01); *F16L 57/06* (2013.01)

(58) Field of Classification Search
CPC ................................ F16L 57/005; F16L 57/06
USPC ......................................... 138/96 T, 96 R, 89
See application file for complete search history.

(56) References Cited

U.S. PATENT DOCUMENTS

| | | | | |
|---|---|---|---|---|
| 3,038,502 A | * | 6/1962 | Hauk .................... | E21B 17/006 138/96 R |
| 4,398,566 A | * | 8/1983 | Janzen .................. | B65D 59/06 138/96 T |
| 4,415,005 A | * | 11/1983 | Janzen .................. | E21B 17/006 138/89 |
| 4,616,679 A | * | 10/1986 | Benton ................. | F16L 57/005 138/96 R |
| 4,655,256 A | * | 4/1987 | Lasota .................. | B65D 59/02 138/96 T |
| 5,437,309 A | * | 8/1995 | Timmons .............. | F16L 55/115 138/89 |
| 8,881,772 B2 | * | 11/2014 | Lubbers ................ | B65D 59/06 138/96 T |
| 2008/0223473 A1 | * | 9/2008 | Palmer ................. | F16L 55/1157 138/96 T |

* cited by examiner

*Primary Examiner* — Patrick F Brinson
(74) *Attorney, Agent, or Firm* — Egbert, McDaniel & Swartz, PLLC

(57) ABSTRACT

A thread protector for threads of the pipe has a collet having an inner surface, and outer surface and an end surface, a sleeve cooperative with the collet, and an arm pivotally mounted to the sleeve and having a surface bearing against the and surface of the collet. The collet is adapted to engage the threads of the pipe. The sleeve has a plurality of tapered surfaces thereon. The arm is movable between a first position in which the collet is free of the threads of the pipe and a second position in which the collet moves along the tapered surfaces of the sleeve such that the collet engages the threads of the pipe.

16 Claims, 11 Drawing Sheets

QUICK RELEASE THREAD PROTECTOR FOR THREADS OF A PIPE

CROSS-REFERENCE TO RELATED APPLICATIONS

The present application claims priority from U.S. Provisional Patent Application Ser. No. 62/945,646, filed on Dec. 9, 2019 and entitled "Quick Release Thread Protector".

BACKGROUND OF THE INVENTION

1. Field of the Invention

The present invention relates to the field of thread protectors for pipes. More particularly, the present invention relates to a quick release universal thread protector for pipes which can be used on both the pin and box ends of the pipe.

2. Description of Related Art Including Information Disclosed Under 37 CFR 1.97 and 37 CFR 1.98

Pipes, such as pipes used for oil and gas drilling and production, are often produced in sections and are axially connected end-to-end. Typically, the connection involves the use of a male, externally threaded portion at one end of one pipe section that is threadingly engageable with a mating female, internally threaded portion at the end of an axially adjacent pipe section. The male, externally threaded end of a pipe, is often referred to as the pin end, and the female, internally threaded end of a pipe, is often referred to as the box end.

The ends of the pipe, including the threads, are subject to damage when not in actual use, such as from corrosion, impacts with other objects, or from being dropped during transportation or storage. Such damage may render the pipe faulty or unusable, resulting in delay, hardship and increased expense. Devices known as thread protectors are commonly used to protect the ends of pipes, and in particular, to protect the internal and external threads on the ends of pipes from such damage. A pin end thread protector is connected to and protects the pin end of the pipe and associated external threads. A box end thread protector is connected to and protects the box end of the pipe and associated internal threads. The thread protectors are designed to prevent damage to the respective pipe ends when the pipe impacts other objects, the ground or otherwise is subjected to external impacts. In addition, the thread protectors are designed to seal the ends of the pipe to reduce the potential for premature corrosion of the pipe and/or threads.

Pipes used for oil and gas drilling and production can vary in nominal diameter from two inches to over thirty inches. Further, many pipe manufacturing companies and exploration and production (E&P) companies have developed proprietary thread forms dictating thread geometry (e.g., square threads, trapezoidal threads), thread size (e.g., thread height), and thread pitch (e.g., the number of threads per inch). In addition, the American Petroleum institute (API) has several thread form standards. As a result, there are over 3,000 different combinations of pipe diameters and thread forms (i.e., thread geometries and thread pitches).

To protect both the pin end and box end of a pipe section, conventional thread protectors typically come in two types—a pin end thread protector that is disposed about the pin end of the pipe and includes internal threads that engage the external threads on the pin end, and a box end thread protector that is positioned in the box end of the pipe and includes external threads that engage the internal threads on the box end. The pin end thread protector is sized, configured, and designed such that its internal threads mate with the external threads of the pin end; and the box end thread protector is sized, configured, and designed such that its external threads mate with the internal threads of the box end. In other words, the internal threads of the pin end protector fit between the external threads of the pin end as the pin end protector is threaded onto the pin end, and the external threads of the box end protector fit between the internal threads of the box end as the box end protector is threaded onto the box end.

FIG. 1 shows a pair of standard thread protectors 10 as used in the prior art. FIG. 1 shows a thread protector 12 for the box end of a pipe, and a thread protector 14 for the pin end of a pipe. The thread protector 12 for the box end of the pipe includes an external thread 16 and an end 18 which extends outwardly of the pipe. The end 18 typically has a means for affixing or screwing the thread protector 12 into the box end of the pipe.

FIG. 1 also shows the thread protector 14 for the pin end of the pipe. The thread protector 14 has an internal thread 20 for receipt of the pin end of the pipe. End 22 of the thread protector 14 extends outwardly from the pin end of the pipe, and similarly has a means for affixing the thread protector 14 to the pipe. Affixing and removing such thread protectors from the pipe is very time-consuming.

Various patents have issued have been published in the past relating to end caps or thread protectors for pipes. For example, U.S. Patent Publication No. 2010/0037977, published on Feb. 18, 2010 to Rahimzadeh et al., describes a universal pipe cap. The universal pipe cap includes a fluid impervious base and an adjustable sleeve extending from the base and configured to couple to a plurality of pipe ends that vary in size. A securement mechanism selectively sealingly engages the adjustable sleeve to one of a plurality of pipe ends so that the adjustable sleeve and the fluid impervious base are able to cooperate with one another to cap the pipe end. The adjustable sleeve is made from a flexible material and may attach to pipe ends that are either larger in diameter or smaller in diameter than the inside diameter of the adjustable sleeve.

U.S. Pat. No. 6,935,380, also to Rahimzadeh et al. describes a reversible dual size plumbing end cap. The plumbing end cap has either a first outer diameter or a second outer diameter that includes a fluid impervious base for overlying the end of the selected pipe. The end cap also includes an endless wall fixed to a perimeter of the base and configured to seal the end of the selected pipe. The endless wall is pivotable between a first configuration to fit the first outer diameter and a second configuration to fit the second outer diameter.

U.S. Pat. No. 6,568,430, issued on May 27, 2003 to Shafer, describes a quick release pipe band. The quick release mechanism has a band with slots thereon which is enclosed by latching mechanism. Cams on the end of the locking lever engage with slots in the band and tighten the band about the cap. The pipe end cap of the Shafer patent is intended for use in closing one end of the pipe for transporting materials to job sites using a large pipe in a storage container.

U.S. Pat. No. 6,332,478, issued on Dec. 25, 2001 to Holden et al., describes a reusable pipe flange cover. The molded, flexible pipe flange cover for temporarily covering a pipe flange and a pipe opening includes a substantially round center portion having a peripheral skirt portion depending from the center portion. The center portion is adapted to engage a front side of the pipe flange and to seal the pipe opening. The peripheral skirt portion is formed to include a plurality of circumferentially spaced tabs, wherein free ends of the flexible tabs are formed with respective through passages adapted to receive a drawstring for pulling the tabs together on a back side of the pipe flange.

U.S. Pat. No. 5,524,672, issued on Jun. 11, 1996 to Mosing et al., describes a casing thread protector. The thread protector has a toroidal body of elastomer with a bore to accept a pipe end and a metal band and clamp arrangement extending around its periphery. The body is cut through one side to allow the body to expand peripherally. The bore accepts the end of a pipe with threads to be protected when the periphery is expanded and grips the pipe with the bore when the clamp closes the cut and shrinks the bore. To increase unit loading to force more elastomer of the body into thread grooves, the bore has projections for gripping pads, or is recessed radially to produce gripping pads. The pads, which may be replaceably attached, have a reduced area that increases deformity under clamping pressure and increases the force required to dislodge the protector from threads. The metal band is removable from an open peripheral groove or an optional arcuate tunnel partially encircling the pad body.

U.S. Pat. No. 10,520,125, issued on Dec. 31, 2019 to the present applicant, describes a universal thread protector for protecting either of the pin or box ends of a pipe. The thread protector has a cap with an open end and a closed end. A seal element is positioned within and adjacent to the open end of the cap. A ring member is positioned against the seal element between the seal element and the closed end of the cap. Bolts are provided having an end positioned against the ring member. The bolts are movable from an unactuated position to an actuated position when the bolt applies a force against the ring member when in the actuated position. The ring member pushes against the seal element so as to deform or compress the seal element against the outer diameter of the pipe positioned within the cap.

U.S. Patent Application Publication No. 2019/0003263, published on Jan. 3, 2019 to the present applicant, teaches a thread protector for use on a sucker rod or a drill pipe. This thread protector has a collet with a plurality of collet segments in which each of the plurality of collet segments has a protrusion adjacent an end thereof, and a sleeve overlying the collet and movable between a first position and a second position. The second position compresses the plurality of collet segments such that the protrusion engages with the thread relief of the sucker rod or drill pipe. This retains the sleeve and the plurality of collet segments over the threaded end of the pipe so as to protect the threaded end of the pipe. The sleeve is movable to the first position such that the protrusions of the plurality of collet segments release from the thread relief so as to allow the thread protector to be removed from the threaded end of the pipe.

It is an object of the present invention to provide a thread protector that can be quickly installed and released from the threads of the pipe.

It is another object the present invention to provide a thread protector that provides visual confirmation of the locked position and proper installation of the thread protector on the threads of the pipe.

It is another object of the present invention to provide a thread protector which when locked has an end that has no structures extending outwardly therefrom which could be potentially damaged.

It is another object of the present invention provide a threaded protector that is has improved sealing capability with respect to the threads of the pipe.

It is another object of the present invention to provide a thread protector that cannot be accidentally dislodged.

It is a further object of the present invention to provide a thread protector that can be easily installed by persons having limited experience or knowledge.

It is still further object the present invention to provide a thread protector that is easy-to-use, easy to manufacture and relatively inexpensive.

These and other objects and advantages of the present invention will become apparent from a reading of the attached specification and appended claims.

BRIEF SUMMARY OF THE INVENTION

The present invention is a thread protector for threads of the pipe. This thread protector comprises a collet having an inner surface, an outer surface and an end surface, a sleeve cooperative with the collet, and an arm pivotally mounted to the sleeve and having a surface bearing against the end surface of the collet. The collet is adapted to engage the threads of the pipe. The sleeve has a tapered surface therein. The arm is movable between a first position in which the collet is free of the threads of the pipe and a second position wherein the collet moves along the tapered surface of the sleeve such that the collet engages the threads of the pipe.

In the preferred embodiment the present invention, the tapered surface is formed on an interior of the sleeve. The sleeve resides over the outer surface of the collet. The threads of the pipe are, preferably, external threads.

The collet has a plurality of fingers extending from the end surface of the collet. Each of the plurality of fingers has an inner surface that engages the threads when the arm is in the second position. The inner surface of the collet has a plurality of ridges formed thereon. The ridges are adapted to be received by the threads of the pipe when the arm is in the second position. The ridges are free of the threads when the arm is in the first position. Each of plurality of fingers has a plurality of plateaued surfaces on the outer surface thereof. The plurality of plateaued surfaces bear against the interior of the sleeve.

The sleeve has a ring structure formed on an inner wall thereof. This ring structure is adapted to bear against an end of the pipe when the arm is in the second position.

The collet has a latch extending outwardly of the end surface thereof. The latch retains the arm in the second position. The end surface of the arm is a cam. The arm has a portion extending outwardly of the cam. The latch retains an end of the portion of the arm opposite the cam. The cam bears against the end surface of the collet during movement between the first and second positions. The end surface of the collet has a retainer extending outwardly therefrom. The retainer receives the cam of the arm when the arm is in the first position. The arm has a latch panel at the end of the portion of the arm opposite the cam. The latch panel has a protrusion that engages the latch of the collet when the arm is in the second position. The portion of the arm is flush with an end of the sleeve when the arm is in the second position.

The arm has a panel having a portion extending across an inner diameter of the sleeve and another portion extending outwardly of this portion. The another portion defines open spaces between the arm and the inner wall of the sleeve. The sleeve has a notch formed adjacent an end of the sleeve opposite the arm. A seal is received in this notch. The seal is adapted to bear against a surface of the pipe away from the threads of the pipe. The sleeve has an inner wall extending across an inner diameter of the sleeve. This inner wall has a plurality of openings formed therein. The plurality of fingers of the collet respectively extend through the plurality of openings of the inner wall of the sleeve. The sleeve has a pair of diametrically opposed holes formed in an inner wall thereof. The arm has a pair of pins respectively received in the pair of diametrically opposed holes of the sleeve such that the arm is in pivotal relation to the sleeve.

This foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

BRIEF DESCRIPTION OF THE SEVERAL VIEWS OF THE DRAWINGS

FIGS. 4A and 4B are cross-sectional views of a thread protector of the preferred embodiment of the present invention as applied to a pipe in which FIG. 4A shows the arm in the first position and FIG. 4B shows the arm in the second position.

DETAILED DESCRIPTION OF THE INVENTION

Figure 1:
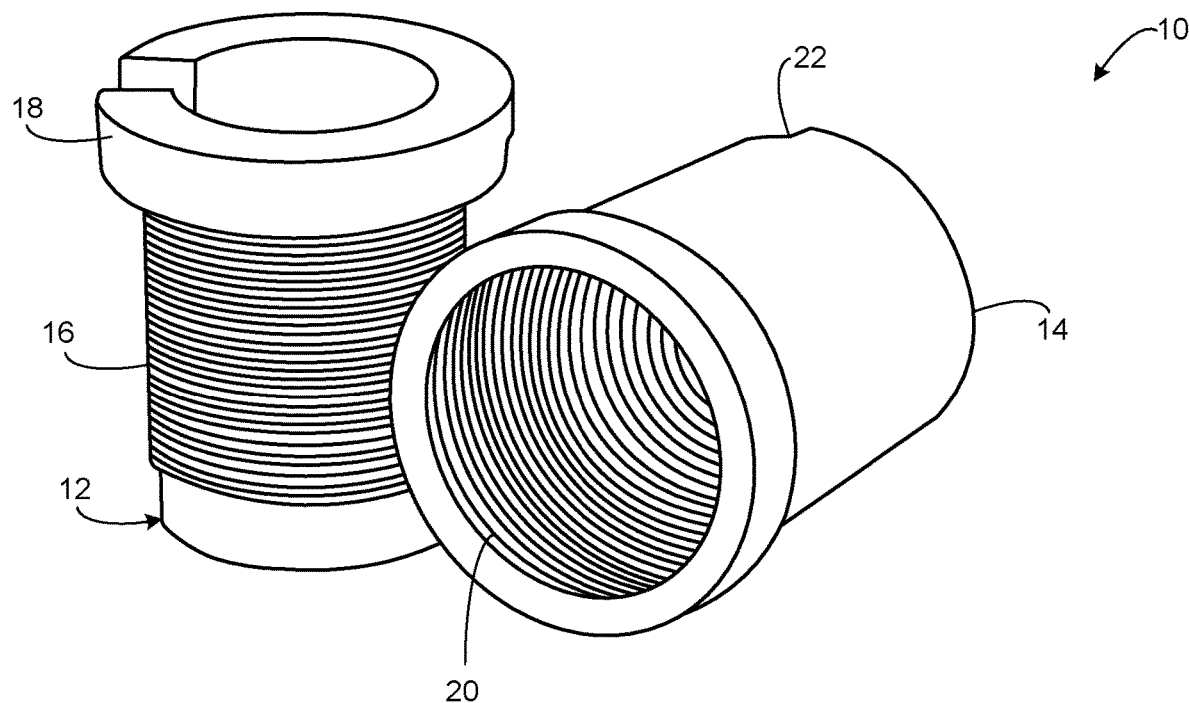
FIG. 1 is a perspective view of a prior art thread protector.
Figure 2A:
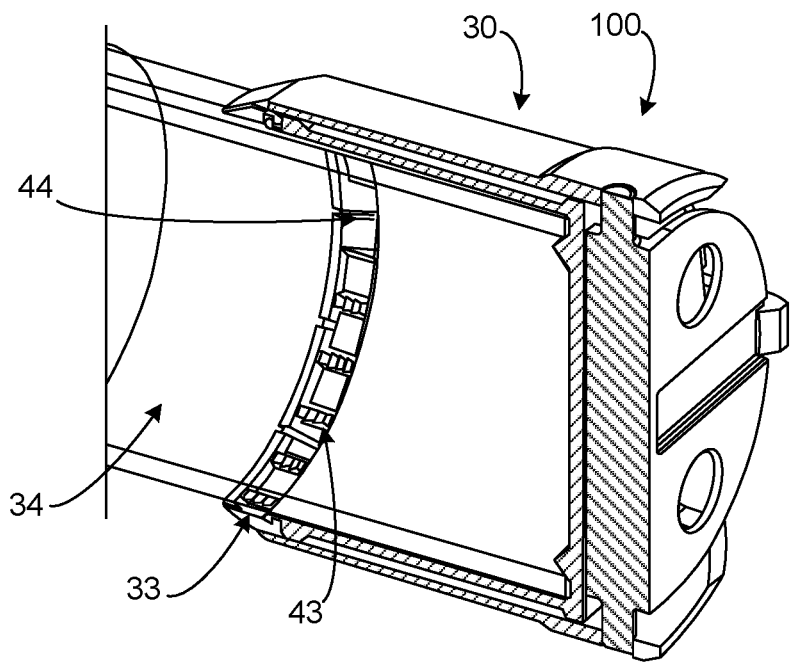
FIGS. 2A and 2B show an interior and an exterior perspective view of a thread protector of the present invention.

Referring to FIG. 2A, there is shown a cross-sectional view of the quick release thread protector 100 of an embodiment of the present invention. In this embodiment, the quick release thread protector is a universal thread protector. The quick release thread protector 100 has an outer sleeve 30 and an inner cap 31. A slip element 33 is positioned at an end of the cap 31 and is encapsulated by the sleeve 30. The slip 33 is shown as being positioned against the pipe 34 inserted into the quick release thread protector 100. As will be explained below, the quick release thread protector can also receive the box end of the pipe 34.

A handle 32 is shown as extending between two aligned holes formed in the sleeve 30 which allow for handle rotation. The handle 32 is accessible through an open end of the universal thread protector 100. The handle 32 has a rectangular cross section, and upon rotation, the handle acts as a cam mechanism to move the sleeve 30 relative to the cap 31, securing the quick release thread protector 100 to the pipe.

As can be seen in FIG. 2A, the quick release thread protector 100 does not have threads on the inside thereof. The end of the pipe 34 merely abuts a surface of the cap 31 and rests against the slip 33. FIG. 2A shows how there is a no space formed between the box end of the pipe 34 and the cap 31. In the case where the pin end of the pipe 34 is inserted into the quick release thread protector 100, a space or void would be created between cap 31 and pipe 34.

Figure 3A:
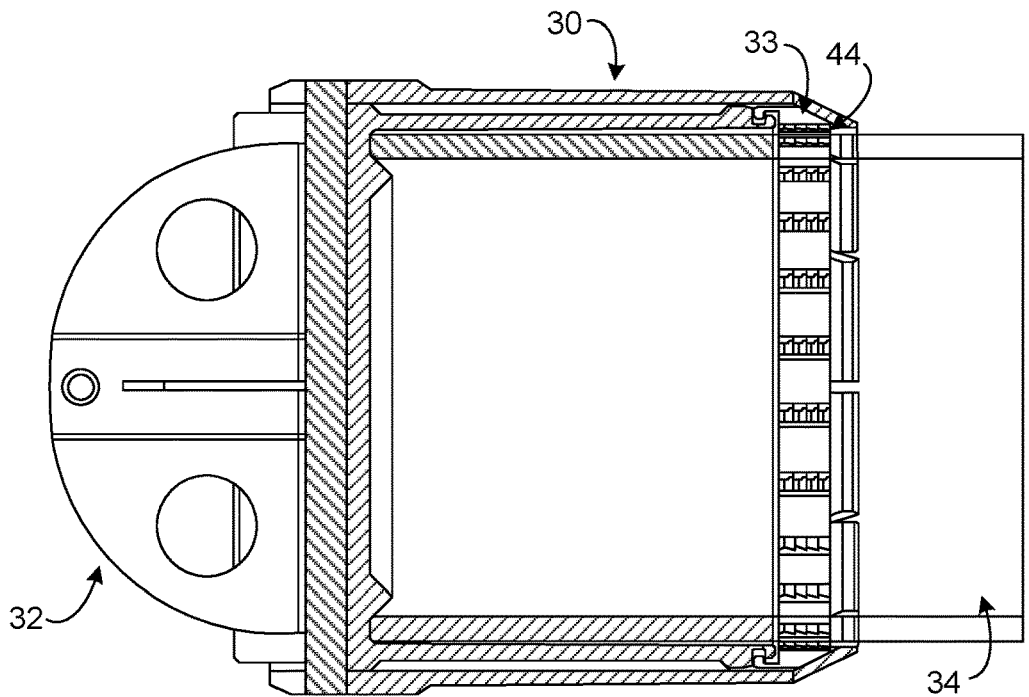
FIGS. 3A and 3B are side elevational views of a thread protector of the present invention showing the arm in the first and second positions, respectively.
Figure 3B:
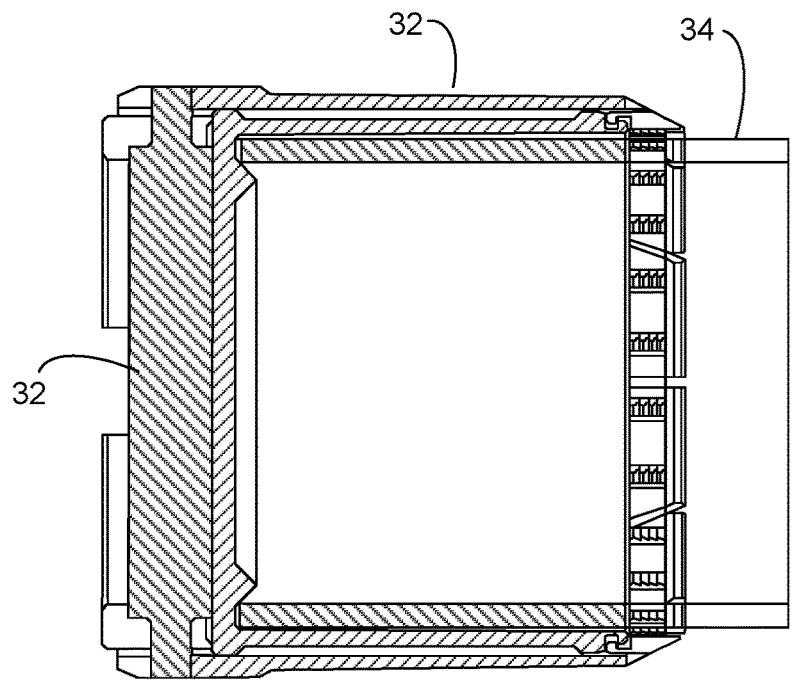

FIGS. 3A-3B are cross-sectional views illustrating the operation of the quick release thread protector 100. FIG. 3A show the quick release thread protector 100 in an unset position, whereas FIG. 3B show the quick release thread protector 100 in a set position against the pipe 34.

In FIG. 3A, it can be seen that in the unset position there is a gap 44 formed between the sleeve 30, the slip 33, and the pipe 34. It is shown how the long edge of the rectangular cross section of the handle 32 abuts the flat face of cap 31. Also, the circular end of the handle 32 extends past the cap 31.

FIG. 3B shows the handle 32 rotated 90°, such that the short end of the rectangular cross section of the handle abuts the flat face of cap 31. Once this rotation occurs, the gap 44 is filled by the now compressed slip 33. The compression of the slip 33 causes the cap 31 and sleeve 30 of the universal thread protector 100 be securely positioned against the pin or box end of the pipe 34. Also the slip 33 has a longitudinal cut 44 that allows for inward deflection when subject to a force.

Figure 2B:
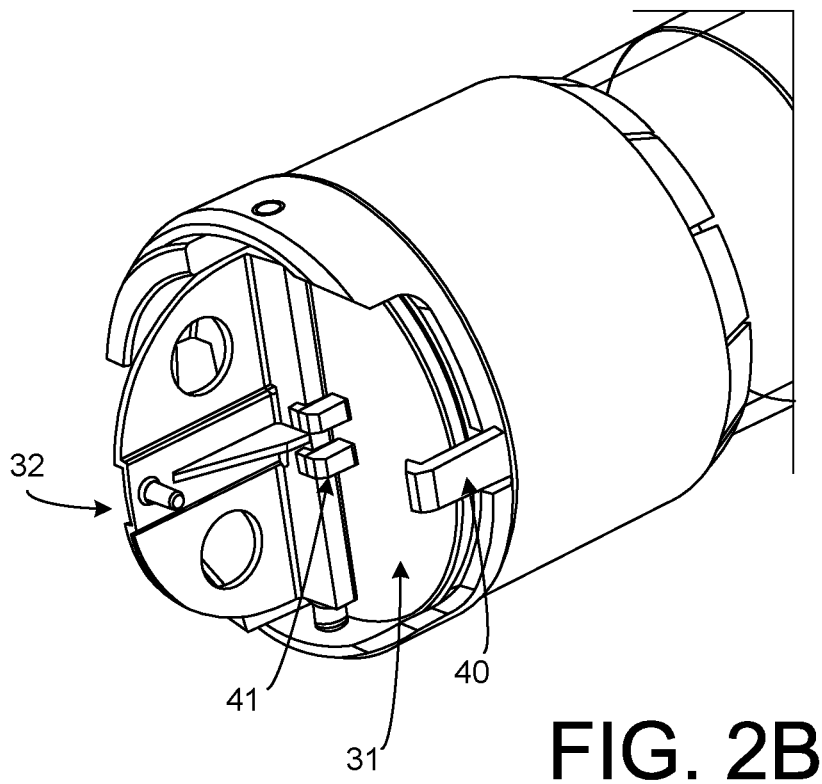

FIG. 2B illustrates a tab 40 that is used to secure handle 32 in the locked position. When rotating the handle, the tab locks into the handle 32. In order to rotate the handle back to the released position, the tab must be opened to allow for this to happen.

As such, the handle 32, acting as a cam mechanism, pushes against and moves the cap 31 relative to the sleeve 30, thereby causing compression of the slip 33.

This quick release thread protector 100 of the present invention can be utilized easily when a plurality of pipes 34 are stacked upon each other. As described above, many of the prior art pipe end caps and thread protectors utilize a latch which is accessible from the radial end of the pipe, rather than the axial end of the pipe. When pipes are stacked, operation of a latch that is located on the radial side of pipe would be very difficult. Conversely, the handle 32 of the quick release thread protector 100 can be accessed from the axial end of the pipe, which allows for easy operation of the quick release thread protector 100 of the present invention.

Figure 4A:
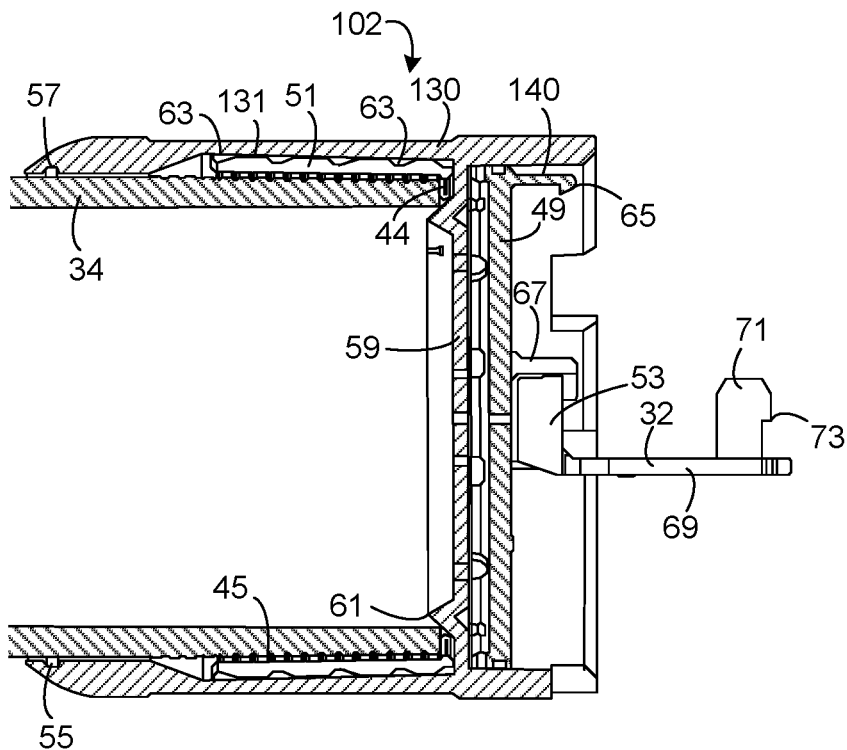
Figure 4B:
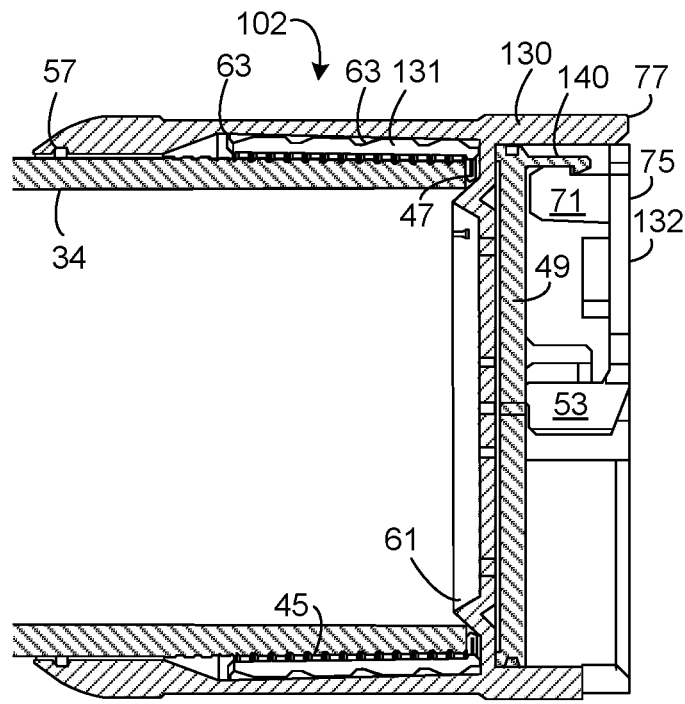

FIGS. 4A and 4B shows a cross-sectional view of thread protector 102 of the preferred embodiment of the present invention as applied to the pipe 34. In this embodiment of the present invention, the pipe 34 has an external threads 45 formed at the end 47 of pipe 34. The collet 131 is illustrated as extending over, but free of, the external threads 45. The outer sleeve 130 bears against the outer surface of the collet 131. The arm 132 is illustrated in its first position. In this first position, the arm 132 serves to release the collet 131 from its position engaging with the external threads 45 of the pipe 34. The arm 132 extends transversely outwardly of the end surface 49 of the collet 131.

With reference to FIG. 4A, it can be seen that the collet 131 has a plurality of ridges 51 that extend toward the external threads 45 of the pipe 34. These ridges 51 will engage with the external threads 45 of the pipe 34 when the collet 34 is compressed by the movement of the collet 131 relative to the outer sleeve 34. In particular, the collet 51 has end surface 49 which will bear against a surface 53 of the arm 132. As a result, when the arm 132 moves from the first position (shown in FIG. 4A) to the second position (shown in 4B), the collet 131 will move so as to be compressed by the outer sleeve 130 and so that the ridges 51 engage with the external threads 45 of pipe 34.

The outer sleeve 130 has a notch 55 at an end thereof opposite the arm 132. Notch 55 may receive an O-ring seal 57 therein. Seal 57 will bear against the outer wall of the pipe 34 so as to be in a generally liquid-tight relationship therewith. As such, seal 57 will resist liquid intrusion toward the external threads 45 of the pipe 34.

The outer sleeve 130 has an inner wall 59 that extends across the inner diameter of the sleeve outer sleeve 130. The inner wall 59 will have a ring structure 61 formed thereon or applied thereto. Ring structure 61 is suitable for bearing against the end 47 of the pipe 34. In the retained position of the thread protector 102, the ring structure 61 will be in a liquid-resistive relationship with the end 47 of the pipe 34.

Importantly, the outer sleeve 130 will have a plurality of tapered surfaces 63 formed on an interior thereof. As will be described hereinafter, as the collet 131 moves on the interior of the outer sleeve 130 (by action of the arm 132), tapers 63 will cause the collet 131 to compress such that the ridges 51 will engage with the threads 45 of the pipe 34.

The collet 131 has a latch 140 formed at the end surface 49 thereof. The latch 140 extends outwardly of the end surface 49. The latch 140 has a suitable hook member 65 facing inwardly thereof. The collet 131 also has a retainer 67 extending outwardly of the end surface 49. Retainer 67 serves to retain the cam surface 53 of arm 132 in order to maintain the arm 132 in its outwardly extending first position. The retainer 67 also serves to limit rotation of the arm 132. The arm 132 includes a portion 69 extending outwardly of the cam surface 53. A latch panel 71 extends transversely outwardly of the portion 69 of the arm 132. Latch panel 71 has a shoulder 73 adapted to engage with the hook portion 65 of the latch 140.

FIG. 4B shows that the arm 132 as moved to the second position. In this second position, the latch panel 71 is engaged with the latch 140 of the collet 131. The cam surface 53 has been rotated so as to bear against the end surface 49 of the collet 131. As such, collet 131 will move along the tapered surfaces 63 of the outer sleeve 130 so as to compress the collet such that the ridges 51 engage with the external threads 45 of the pipe 34.

Importantly, in FIG. 4B, it can be seen that the outer surface 75 of the arm 132 is flush with the end 77 of the outer sleeve 130. As such, there are no surfaces that protrude outwardly that could be damaged by movement of the pipe 34 or by inadvertent contact with other exterior objects. The present invention offers three areas of liquid seal to the external threads 45 of the pipe 34. First, the seal 57 prevents liquid intrusion at one end of the outer sleeve 130. The relationship between the ring structure 61 and the end 47 of the pipe 34 provides further sealing. Additionally, the engagement between the ridges 51 of the collet 131 and the thread 45 of the pipe 34 further restricts liquid intrusion. Also, and importantly, the thread protector the present invention will cover the threads 45 and be retained over the threads of the pipe. As such, this provides protection against potential damage to the threads by external contact with other objects. The engagement between the ridges of the collet 131 and the threads 45 of the pipe 34 will prevent accidental dislodging or removal of the thread protector 102. The movement of the arm 132 from the first position to the second position (shown in FIG. 4B) provides a visual indication to the operator that the thread protector 102 has been properly placed and sealed upon the threads of the pipe. As such, this provides proper visual feedback to users that installation has been completed and is proper.

Figure 5A:
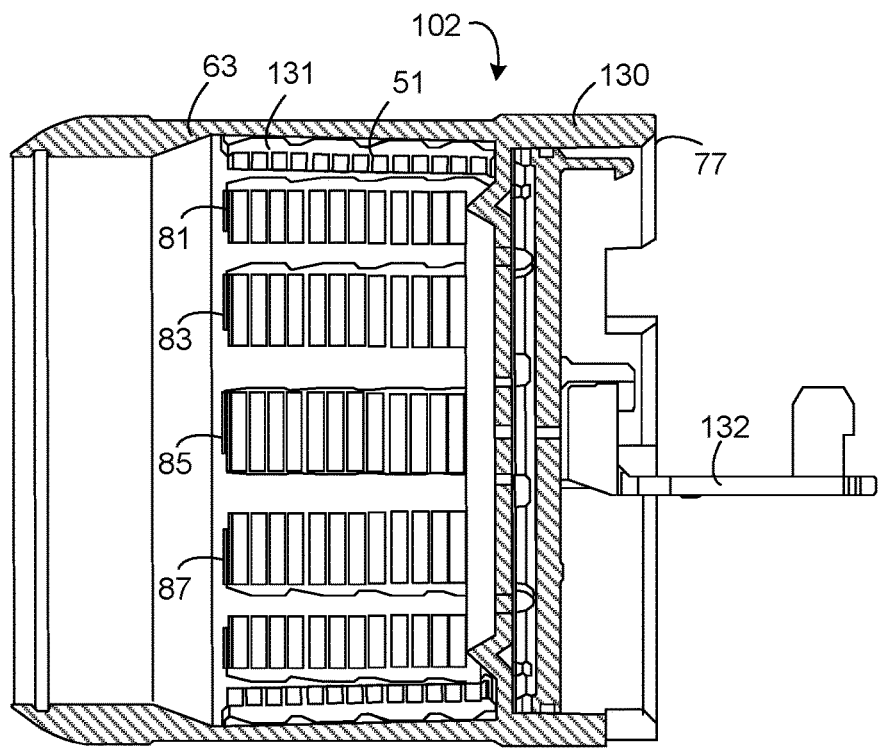
FIGS. 5A and 5B are cross-sectional views showing the thread protector of the preferred embodiment of the present invention in the first position and the second position, respectively.
Figure 5B:
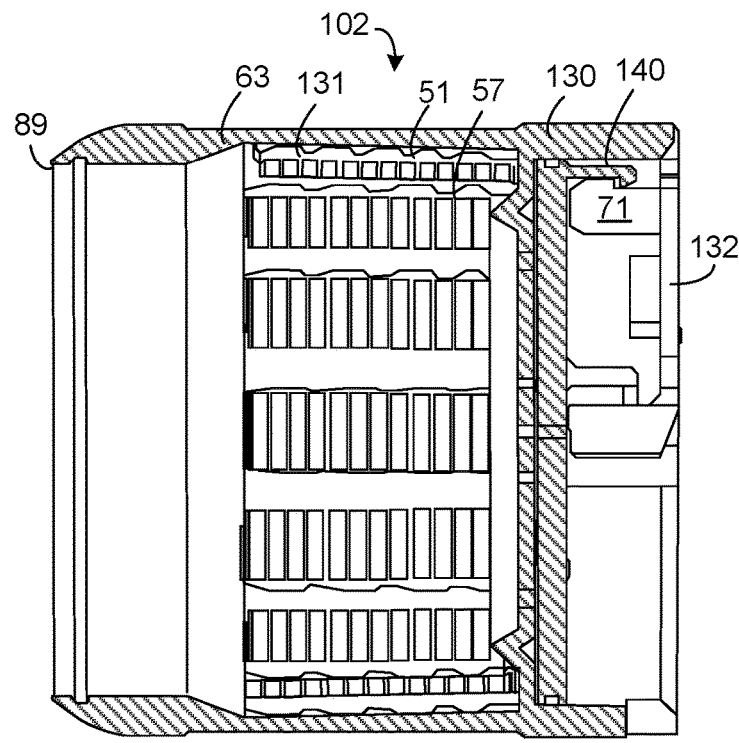

FIGS. 5A and 5B shows the thread protector 102 away from the pipe 34. FIG. 5A illustrates that the arm 132 is in the first position extending outwardly of the end 77 of the outer sleeve 130. The collet 131 is illustrated as having a plurality of fingers 81, 83, 85 and 87 in spaced relation to each other. Ultimately, the inner surface of the outer sleeve 130 will bear against these fingers 81, 83, 85 and 87 so as to compress the fingers 81, 83, 85 and 87 inwardly and toward each other in order to properly engage with the threads of the pipe. This is accomplished by movement of the surfaces of the fingers of the collet 131 along the tapered surfaces 63. Each of the fingers 81, 83, 85 and 87 has ridges 51 formed thereon. These ridges will engage with the threads of the pipe.

FIG. 5B shows that the arm 132 is in its closed or second position. In this position, the latch panel 71 is received by the latch 140. This retains the arm 132 in the second position. The collet 131 is moved toward the end 89 of the outer sleeve 130, engaging with the tapered surfaces 63 and to compress such that the ridges 51 will engage with the threads of the pipe.

Figure 5C:
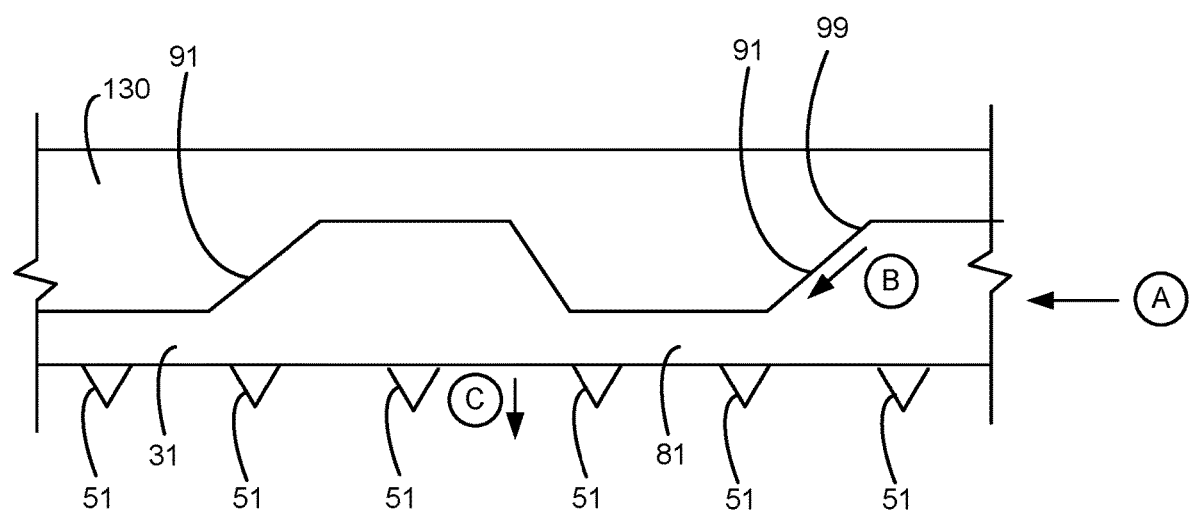
FIG. 5C illustrates an isolated view of the interface between the inner surface of the outer sleeve and the outer surface of the collet.

FIG. 5C illustrates this engagement by illustrating an isolated view of the interface between the collet 131 and the inner surface of the outer sleeve 130. As shown in FIG. 5C, the inner surface of the outer sleeve has a plurality of tapered surfaces 63 which contact corresponding surfaces 99 of the collet. When the arm 132 moves to the second, closed position, the collet 131 moves relative to the outer sleeve in a direction indicated by the arrow A. Due to the angled shape of the tapered surfaces 63 and corresponding shapes of the surfaces 99 of the collet, the collet 131 is directed along the surface of the tapered surfaces 63 (see arrow B), causing movement in the direction of arrow C. This movement causes compression of the collet such that the ridges 51 engage the threads of the pipe.

In FIG. 5C, the outer surface of the collet 131 is shown as being completely mated with the inner surface of the outer sleeve 130 (when the arm 132 is in the first position) due to the complementary shapes of the tapered surfaces 63 of the outer sleeve 130 and the surfaces 99 of the collet 131. The shapes need not be completely complementary fit. However, the angled nature of at least one of the surfaces 63 and 99 is required to urge the collet 131 to compress in the direction of arrow C when movement and force is applied to the collet 131 in the direction of arrow A.

Figure 6A:
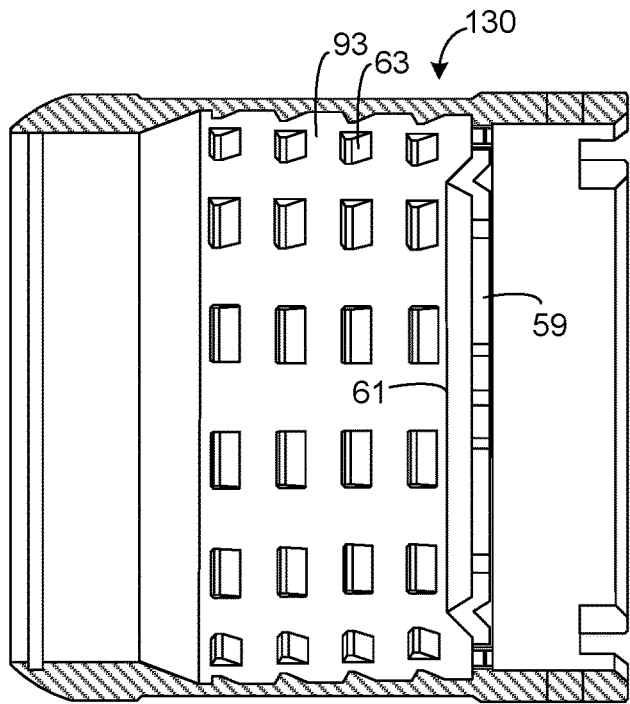
FIGS. 6A and 6B show cross-sectional and end views, respectively, of the sleeve as used in the thread protector of the preferred embodiment of the present invention.

FIG. 6A shows the outer sleeve 130 of the present invention. FIG. 6A more clearly illustrates how the outer sleeve 130 includes a plurality of tapered surfaces 63 formed on an inner wall 93 thereof. Tapered surfaces 63 will act to compress the fingers 81, 83, 85 and 87 of the collet 131 during movement along the interior of the outer sleeve 130. The ring structure 61 is formed on the inner wall 59 of the outer sleeve 130. Ring surface 61 has a generally triangular shape so as to adaptively engage with the corner of the pipe at the end of the pipe.

Figure 6B:
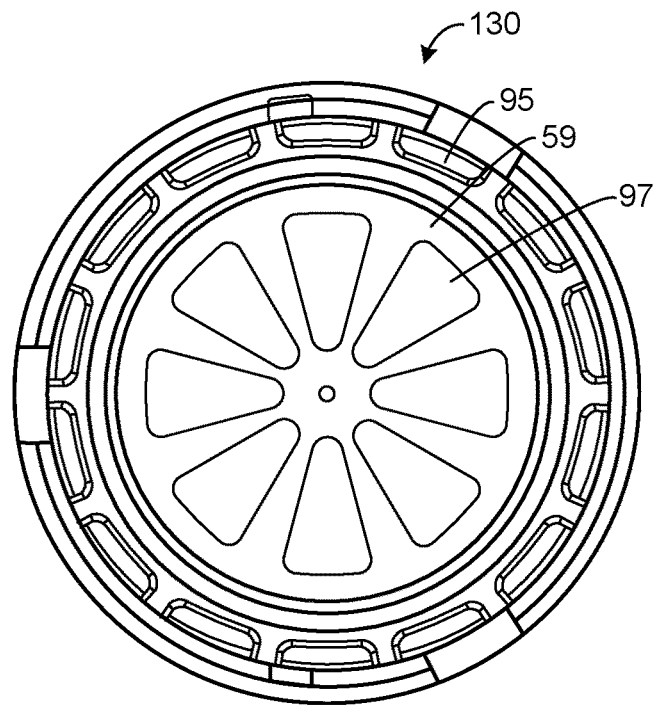

FIG. 6B shows an end view of the outer sleeve 130. Outer sleeve 130 includes a plurality of slots 95 arranged circumferentially and in evenly spaced relationship to each other. Slots 95 are adapted to receive the fingers of the collet 130 therein. The fingers of the collet 130 will extend through the slots 95. As such, the slots 95 serve to assure the proper orientation of the fingers of the collet 130 when applied over the end of the pipe. Areas 97 are formed on the inner wall 59 of the outer sleeve 130. These areas serve to enhance the structural integrity of the inner wall 59.

Figure 7A:
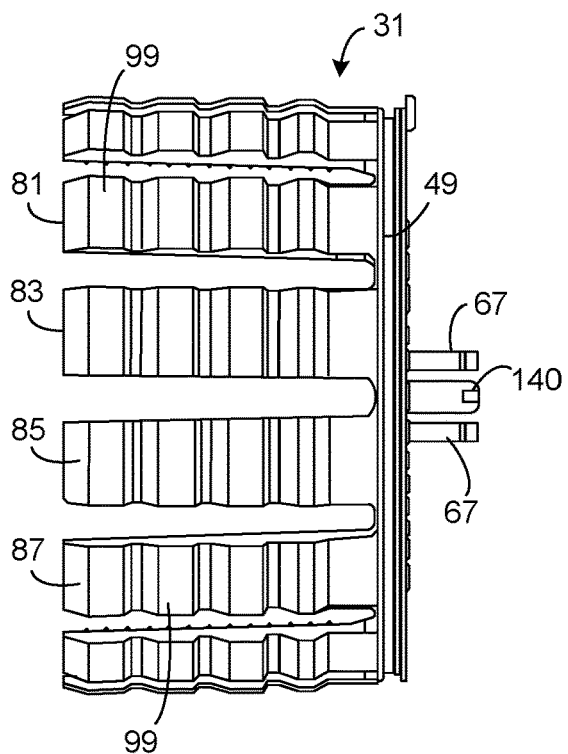
FIGS. 7A and 7B show side elevational view and a perspective view of the collet as used in the thread protector of the preferred embodiment of the present invention.

FIG. 7A shows an isolated view of the collet 130 as used in the present invention. Collet 131 has an retainer 67 extending outwardly therefrom. The latch 140 is illustrated is also extending outwardly of the end surface 49. The plurality of fingers 81, 83, 85 and 87 extend outwardly from an opposite side of the end surface 49. Each of the fingers 81, 83, 85 and 87 is adapted to extend through the slots 95 of the outer sleeve 130. It can be seen that each of the fingers 81, 83, 85 and 87 are arranged in spaced relationship to each other. Each of the fingers 81, 83, 85 and 87 has plateaued surfaces 99 formed on the outer surface thereof. As previously explained, angled portions of the plateaued surfaces 99 will interact with the tapered surfaces 63 of the outer sleeve 130 so as to achieve a proper compressing of the collet 131 during the movement of the arm 132 between the first position and a second position.

Figure 7B:
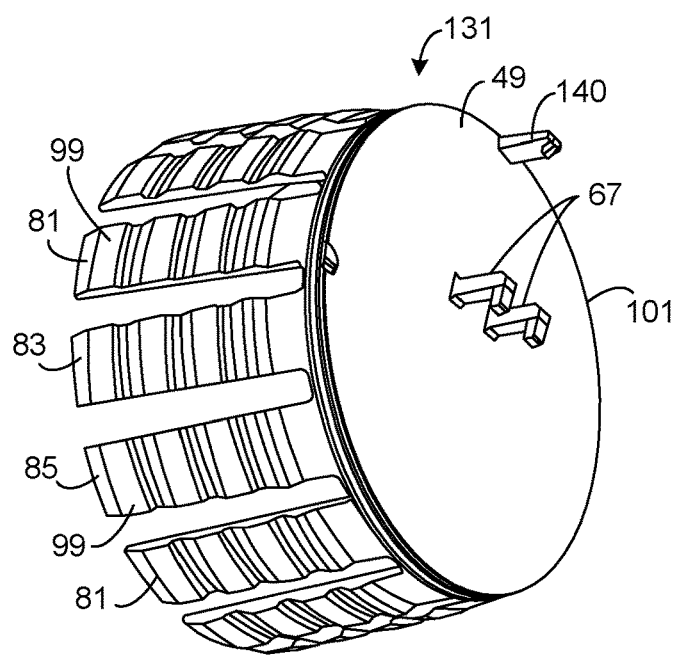

FIG. 7B is a perspective view of the collet 131. The latch 140 extends outwardly of the end surface 49 of the collet 131 generally adjacent to the periphery 101 of the end surface 49. The retainers 67 extend outwardly of the end surface 49 generally adjacent to the center of the end surface 49. The fingers 81, 83, 85 and 87 are arranged so as to extend outwardly from the opposite side of the end surface 49. Each of the fingers 81, 83, 85 and 87 has plateaued surfaces 99 thereon. It can be seen that there are several fingers similar to fingers 81, 83, 85 and 87 that extend around the periphery 101 of the collet 131.

Figure 8A:
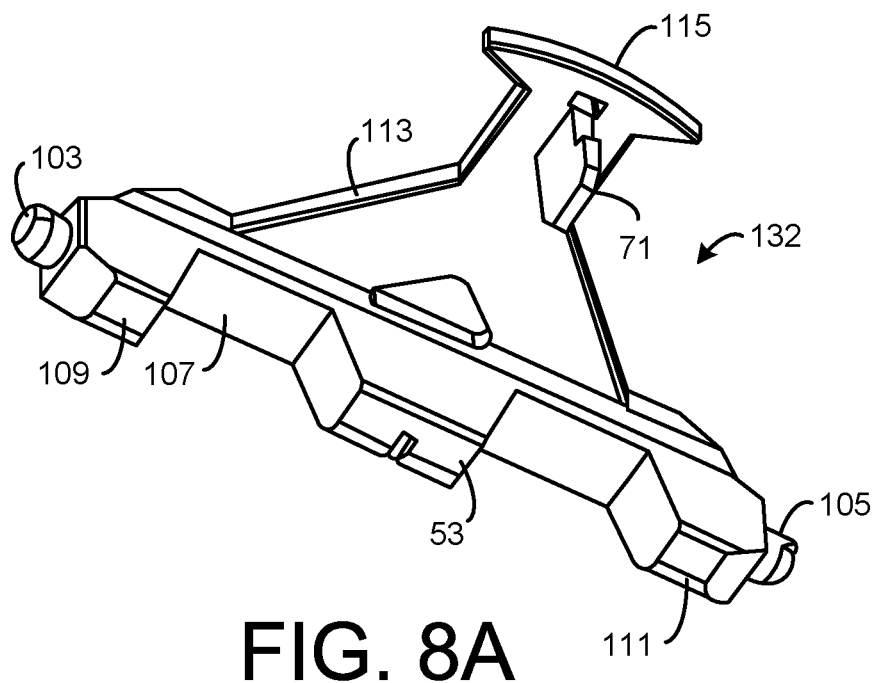
FIGS. 8A and 8B show perspective views of the inner surface and outer surface of the arm of the thread protector of the preferred embodiment of the present invention.
Figure 8B:
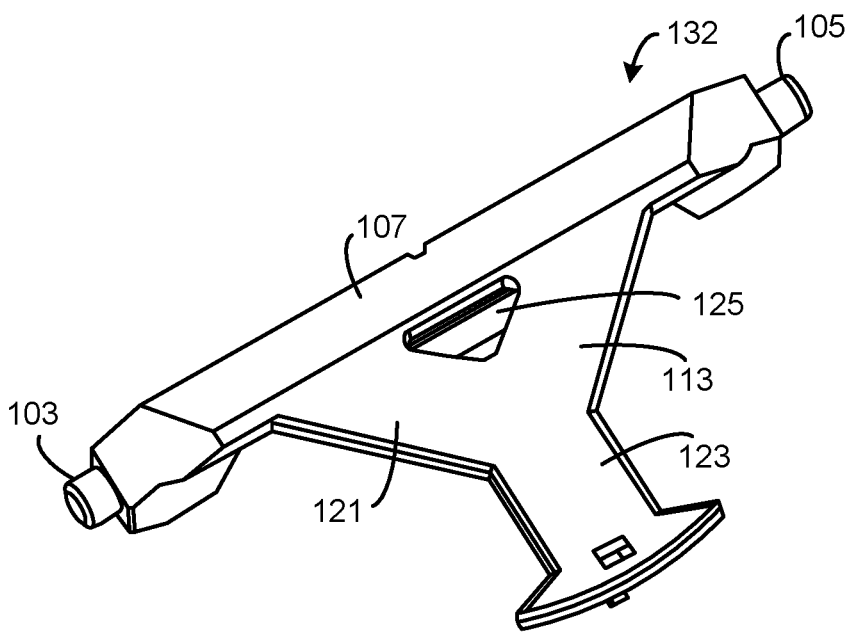

FIGS. 8A and 8B show the arm 132 of the present invention. As was recited herein earlier, the outer sleeve 130 will have a pair of diametrically-opposed holes formed on the inner wall thereof at an end of the outer sleeve. The arm 132 has pins 103 and 105 that extend outwardly from opposite ends of the bar 107. Bar 107 will have the cam surface 53 formed centrally thereof. Support surfaces 109 and 111 are formed adjacent to the pins 103 and 105 so as to provide structural support stability to the arm 132. The arm 132 includes a panel 113 extending outwardly from bar 107. Panel 113 extends transversely to a longitudinal axis of the bar 107. The latch panel 71 extends inwardly of the panel 113 generally adjacent to the outer end 115 of the panel 113.

FIG. 8B shows the arm 132 from an upper perspective view. The bar 107 extends between the pins 103 and 105. Panel 113 has a generally triangular shape such that a central portion 121 extends to an end portion 123. A cut-out 125 is formed through the central portion 121 so as to allow for a visual indication of the movement of the cam surface 53.

Figure 9A:
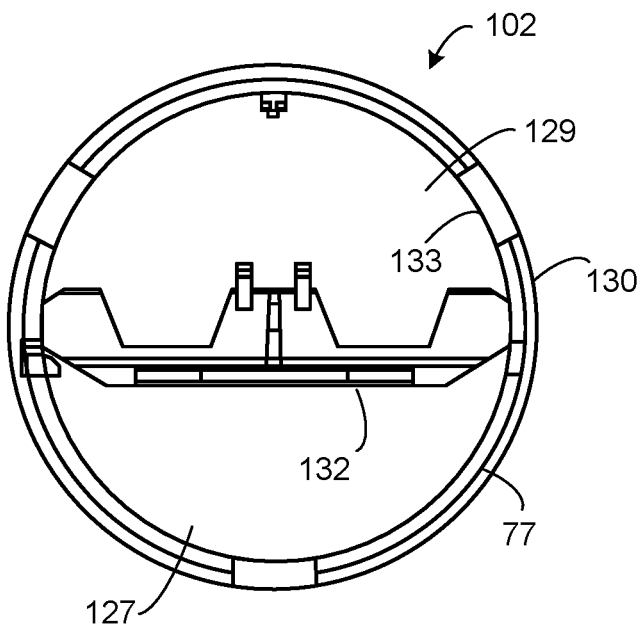
FIGS. 9A and 9B show end views of the thread protector of the present invention in which the arm is in the first position and the second position, respectively.

FIG. 9A shows an end view of the thread protector 102 of the present invention. In FIG. 9A, the arm 132 is in the first position. The end 77 of the thread protector 102 includes a first surface 127 and a second surface 129 on an opposite side of the arm 132. FIG. 9A shows that the pins 103 and 105 are engaged with holes formed on the inner wall 133 of the outer sleeve 130.

Figure 9B:
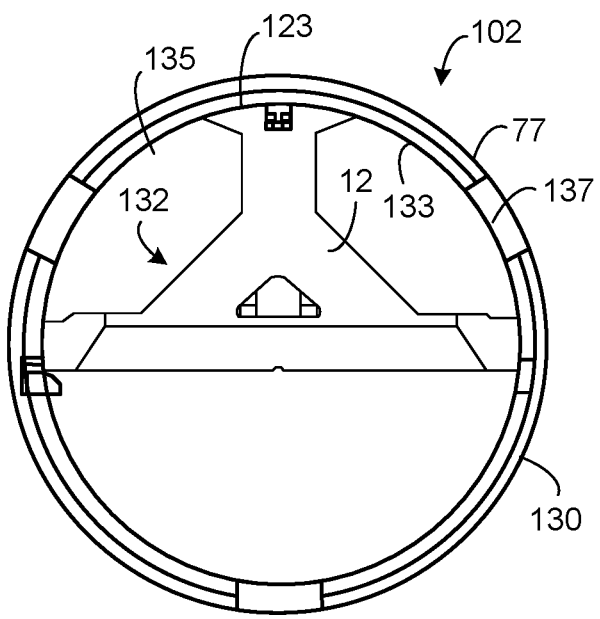

FIG. 9B shows that the arm 132 as moved to its closed position. In the closed position, the arm 132 will be flush with the end 77 of the thread protector 102. The end portion 123 of arm 132 will be received against the inner wall 133 of the outer sleeve 130. Importantly, when the arm 132 is in this closed position, there will be open areas 135 and 137 on opposite sides of the central portion 121 of the arm 132. Open portions 135 and 137 allow access to the latch 140. As such, when it is necessary to remove the thread protector 102 from the threads of the pipe, the operator could reach into these open areas 135 and 137 so as to access the latch so as to release the latch 140 from the latch panel 71. The arm 132 can then move back to the first position so that the engagement between the ridges of the collet is released and the collet and the outer sleeve are free of the threads of the pipe. The thread protector 102 can then be easily removed.

Figure 10A:
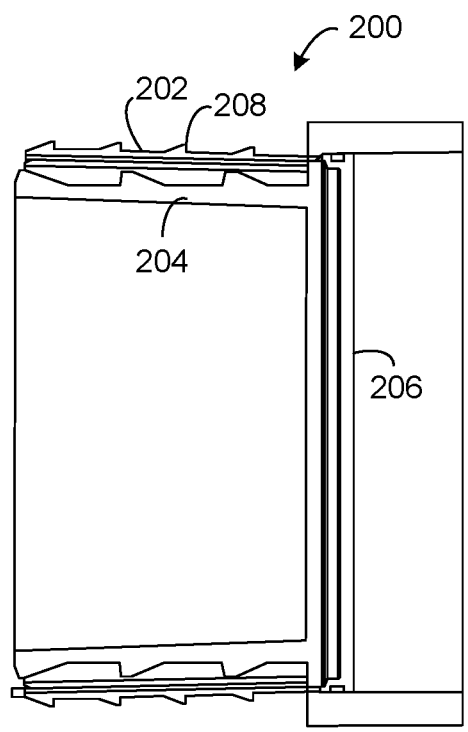
FIGS. 10A and 10B show cross-sectional views and side elevational views, respectively, of a thread protector the present invention as used in association with internal or box threads.
Figure 10B:
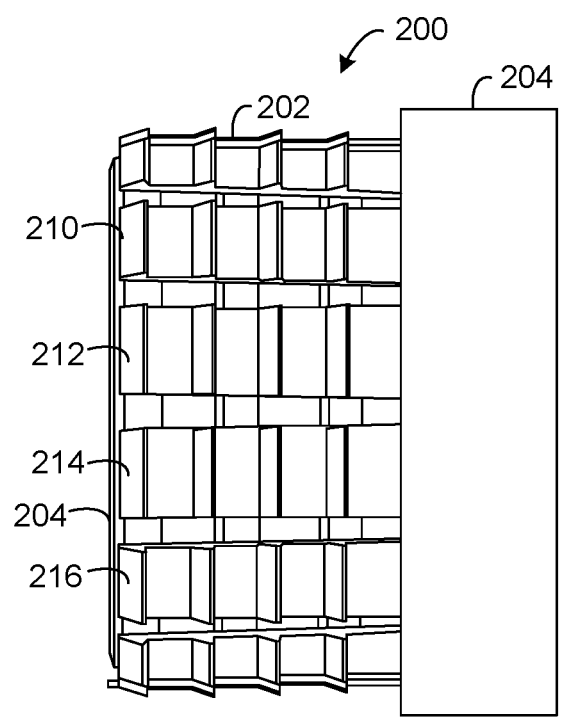

FIGS. 10A and 10B show a thread protector 200 in accordance with an alternative embodiment of the present invention. The thread protector 200 is adapted for use in association with internal threads of a pipe at the box end of a pipe. In particular, the operation of the thread protector 200, as shown in FIGS. 10A and 10B, will be similar to that shown in the previous embodiment. However, the collet 200 will be exterior of the sleeve 204. As such, as the end surface 206 of the collet 202 is moved in one direction (by operation of the arm described herein previously), the projections of the sleeve 204 will bear against the inner wall of the collet 202 so as to cause the ridges 208 of the collet 202 to engage with the internal threads of the pipe.

FIG. 10B shows this thread protector 200 and, in particular, the collet 202 configured in relation to the sleeve 204. In particular, the collet 202 includes fingers 210, 212, 214 and 216 that are in generally spaced relationship to each other. The sleeve 204 is positioned interior of the fingers 210, 212, 214 and 216. As such, a motion of the sleeve the inner sleeve 204 will cause the fingers 210, 212, 214 and 216 to expand relative to each other in order to properly engage with the internal threads of the pipe.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A thread protector for threads of a pipe, the thread protector comprising:
  a collet having an inner surface and an outer surface and an end surface, said collet adapted to engage the threads of the pipe;
  a sleeve cooperative with said collet, said sleeve having a notch formed therein, said sleeve having an inner surface;
  an arm pivotally mounted to said sleeve and having a surface bearing against the end surface of said collet, said arm being movable between a first position in which said collet is free of the threads of the pipe and a second position wherein the collet moves along said inner surface of said sleeve such that said collet engages the threads of the pipe; and
  a seal received in said notch, said seal adapted to bear against a surface of the pipe away from the threads of the pipe.

2. A thread protector for threads of a pipe, the thread protector comprising:

a collet having an inner surface and an outer surface and an end surface, said collet adapted to engage external threads of the pipe, said collet having a plurality of fingers extending from the end surface of said collet, each of the plurality of fingers having an inner surface;

a sleeve cooperative with said collet, said sleeve having an inner surface and an inner diameter and an inner wall extending across said inner diameter, said inner wall having a plurality of openings formed therein, the plurality of fingers of said collet respectively extending through the plurality of openings of the inner wall of said sleeve, said sleeve residing over the outer surface of said collet; and an arm pivotally mounted to said sleeve and having a surface bearing against the end surface of said collet, said arm being movable between a first position in which said collet is free of the threads of the pipe and a second position wherein the collet moves along a surface of said sleeve such that the plurality of fingers of said collet engage the threads of the pipe.

3. The thread protector of claim 2, the inner surface of said collet having ridges formed thereon, the ridges adapted to be received by the threads of the pipe when said arm is in the second position, the ridges being free of the threads when said arm is in the first position.

4. The thread protector of claim 2, each of said plurality of fingers having a plurality of plateaued surfaces on an outer surface thereof, the plurality of plateaued surfaces bearing against the inner surface of said sleeve.

5. The thread protector of claim 2, said sleeve having a ring structure formed on the inner wall thereof, said ring structure adapted to bear against an end of the pipe when said arm is in the second position.

6. The thread protector of claim 2, said collet having a latch extending outwardly of the end surface thereof, the latch retaining said arm in the second position.

7. The thread protector of claim 6, the surface of said arm being a cam, said arm having a portion extending outwardly of the cam, the latch retaining an end of the portion of said arm opposite the cam, the cam bearing against the end surface of said collet during movement between the first and second positions.

8. The thread protector of claim 7, the end surface of said collet having a retainer extending outwardly therefrom, the retainer receiving the cam of said arm when said arm is in the first position.

9. The thread protector of claim 7, said arm having a latch panel at the end of the portion of said arm opposite the cam, the latch panel having a protrusion engaging the latch of said collet when said arm is in the second position.

10. The thread protector of claim 9, the portion of said arm being flush with an end of said sleeve when said arm is in the second position.

11. The thread protector of claim 2, said arm being a panel having a portion extending across the inner diameter of said sleeve and another portion extending outwardly of the portion extending across the inner diameter of said sleeve, the another portion defining open spaces between said arm and the inner wall of said sleeve.

12. The thread protector of claim 2, said sleeve having a notch formed adjacent an end opposite said arm, the thread protector further comprising:

a seal received in said notch, said seal adapted to bear against a surface of the pipe away from the threads of the pipe.

13. The thread protector of claim 2, said sleeve having a pair of diametrically opposed holes formed on the inner wall thereof, said arm having a pair of pins are respectively received in the pair of diametrically opposed holes of said sleeve such that arm is pivotable relative to said sleeve.

14. An apparatus comprising:

a pipe having external threads at an end thereof;

a collet having an inner surface and an outer surface and an end surface, said collet having a latch extending outwardly of the end surface thereof, said collet engaging the threads of said pipe;

a sleeve cooperative with said collet and residing over the outer surface of said collet, said sleeve having a tapered surface on an interior surface thereof; and an arm pivotally mounted to said sleeve and having a cam bearing against the end surface of said collet, said arm movable between a first position in which the collet is free of the threads of said pipe and a second position where in the collet moves along the tapered surface such that said collet engages the threads of said pipe, said latch of said collet retaining said arm in the second position, said arm having a portion extending outwardly of the cam, the latch retaining an end of the portion of said arm opposite the cam, the cam bearing against the end surface of said collet during movement between the first and second positions.

15. The apparatus of claim 14, said collet having a plurality of fingers extending from the end surface of said collet, each of the plurality of fingers having an inner surface that engages the external threads of said pipe when said arm is in the second position.

16. The apparatus of claim 15, the inner surface of said collet having a plurality of ridges formed thereon, the ridges being received by the external threads of said pipe when said arm is in the second position, the ridges being free of the external threads of said pipe when said arm is in the first position.

* * * * *